April 22, 1958 G. J. WEBER 2,831,489
VEHICLE TENT
Filed Nov. 1, 1956 2 Sheets-Sheet 1
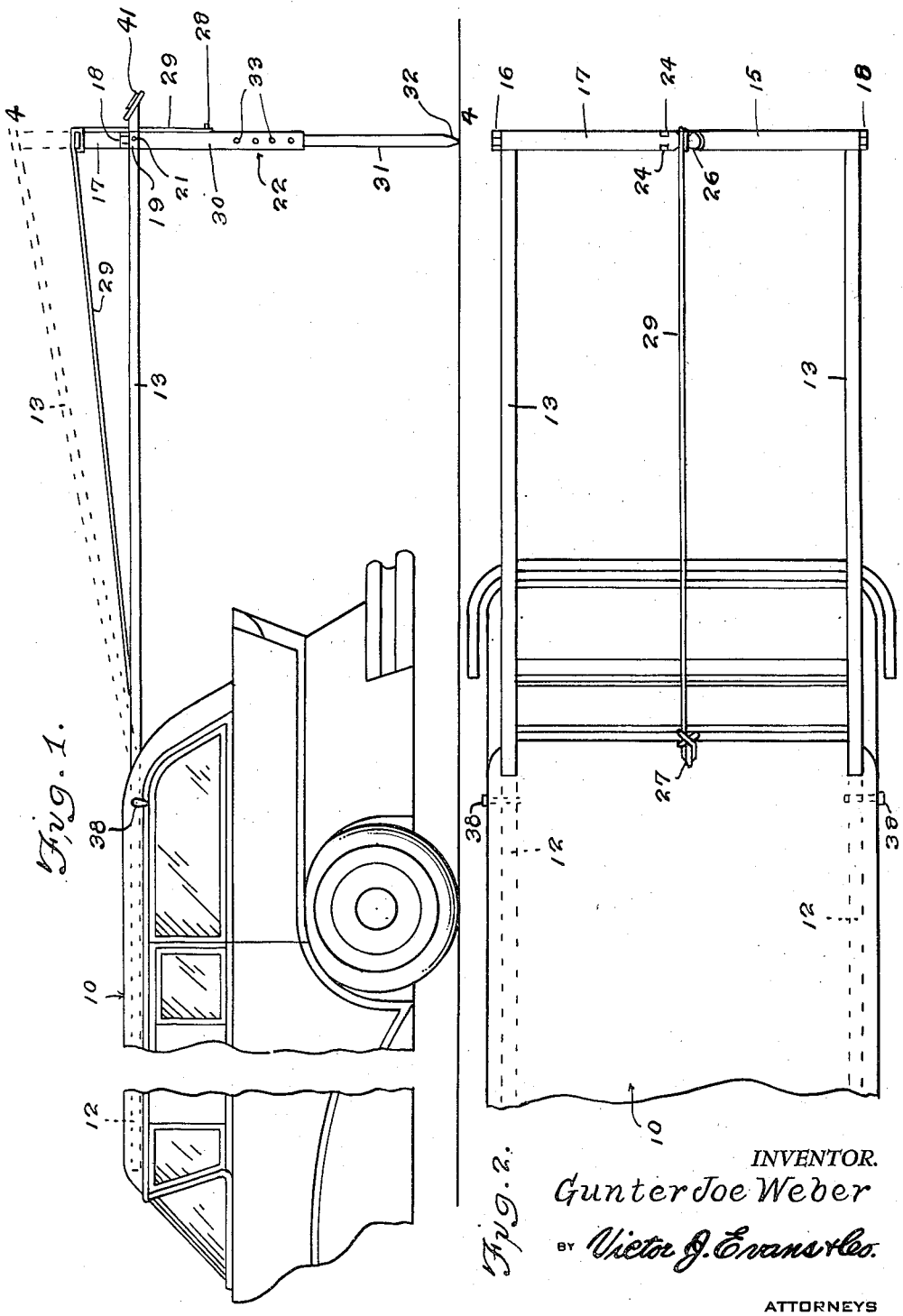
INVENTOR.
Gunter Joe Weber
BY Victor J. Evans & Co.
ATTORNEYS

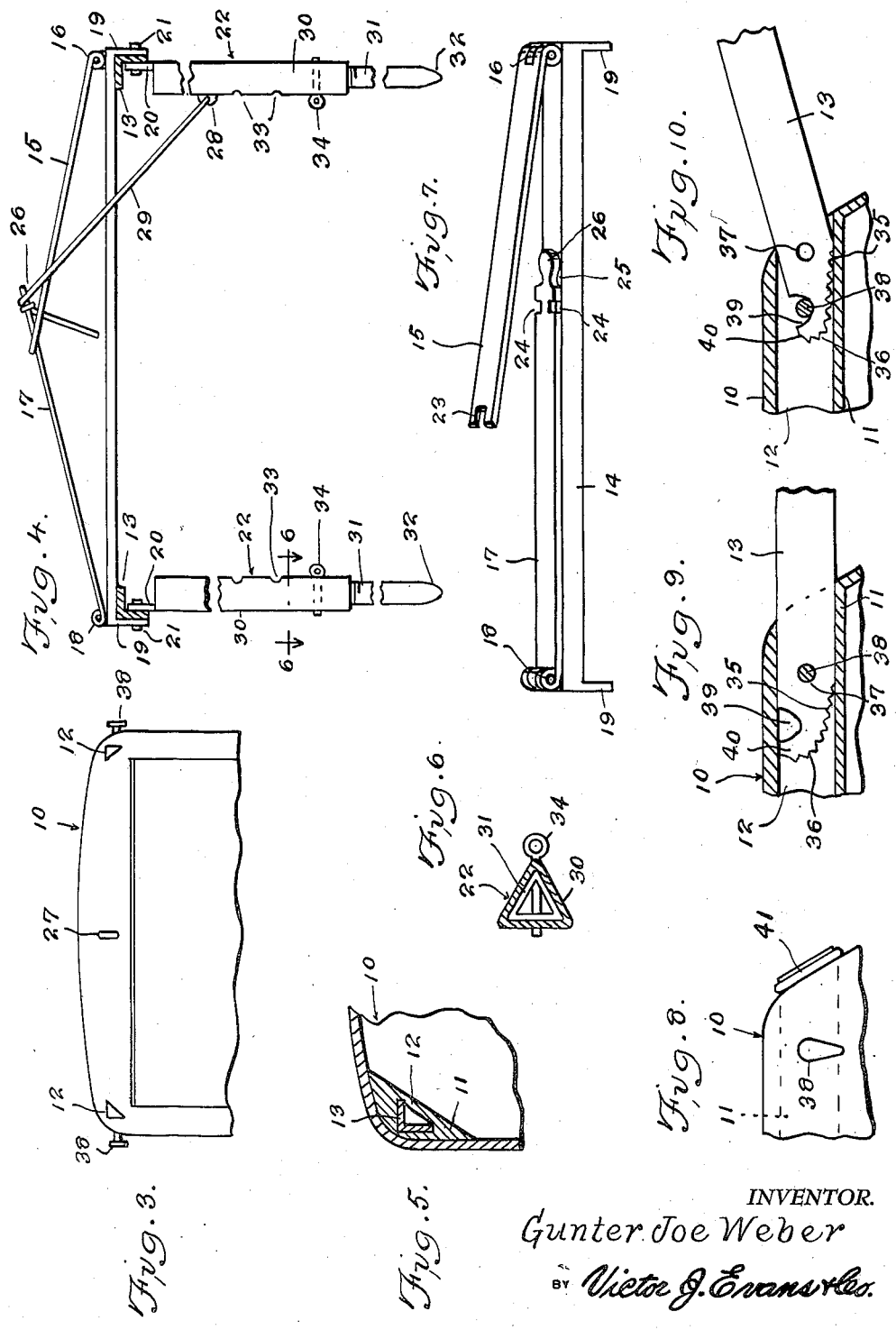

2,831,489

VEHICLE TENT

Gunter Joe Weber, Montreal, Quebec, Canada

Application November 1, 1956, Serial No. 619,744

4 Claims. (Cl. 135—4)

This invention relates to a tent, and more particularly to a tent or tent frame for connection to a vehicle such as an automobile, station wagon or the like.

The object of the invention is to provide a tent frame which can be readily set-up and partially supported by a vehicle such as an automobile or station wagon, whereby campers, hunters or the like can conveniently use the tent for any desired purpose.

Another object of the invention is to provide a tent frame for attachment to a motor vehicle, the tent frame being adjustable so that the height thereof can be changed to permit the device to be used by people under different circumstances and whereby the frame can be readily folded or moved to a compact position or arrangement when it is not being used so that it will occupy a minimum amount of space for storage or shipment.

A further object of the invention is to provide a vehicle tent frame which is extremely simple and inexpensive to manufacture.

Other objects and advantages will be apparent during the course of the following description.

In the accompanying drawings, forming a part of this application, and in which like numerals are used to designate like parts throughout the same.

Figure 1 is a side elevational view illustrating the frame of the present invention attached to a vehicle such as a station wagon, and with parts of the vehicle broken away.

Figure 2 is a top plan view of the assembly shown in Figure 1.

Figure 3 is an end elevational view of the vehicle showing the tent frame detached.

Figure 4 is an end elevational view of the tent frame, with parts broken away and in section.

Figure 5 is a sectional view taken through the vehicle showing certain constructional details of the sliding connection between the frame and vehicle.

Figure 6 is a sectional view taken on the line 6—6 of Figure 4.

Figure 7 is a perspective view illustrating the portion of the tent frame detached from the remainder of the assembly.

Figure 8 is a fragmentary side elevational view illustrating one of the means in retracted position as when the tent frame is not being used.

Figure 9 is a fragmentary sectional view illustrating a connection between one of the beams and the vehicle.

Figure 10 is a view similar to Figure 9, but showing the means in raised position.

Referring in detail to the drawings, the numeral 10 designates a vehicle such as a station wagon to which the tent frame of the present invention is adapted to be connected, and the vehicle 10 is provided with a pair of spaced apart support members 11 which each have a channel way 12 arranged therein, Figure 5. Slidably mounted in each channel way 12 is an L-shaped beam 13. The tent frame of the present invention further includes a horizontally disposed bar 14, Figure 7, and a pair of arms 15 and 17 are hingedly connected to the bar 14 by means of hinges 16 and 18 respectively. Vertically disposed ears 19 depend from the ends of the bar 14, and the ears 19 are connected to lugs 20 which are on the upper ends of leg assemblies 22, and the ears 19 are connected to the lugs 20 in any suitable manner, as for example, by means of bolt and nut assemblies 21, Figure 4.

The first arm 15 is provided with a slot 23 in its free end, while the other arm 17 is provided with opposed cutouts 24 which are adapted to engage the slot 23 when the arms are in the position shown in Figure 4. The arm 17 is further provided with a recessed end portion 25 which defines a shoulder 26 for a purpose to be later described.

Extending rearwardly from the vehicle 10 is an eyelet 27, and one of the leg assemblies 22 is provided with an eyelet 28, there being a cable 29 trained over or engaging the recessed portion 25 of the arm 17, and the ends of the cable 29 are connected to the eyelets 27 and 28. The cable 29 thus serves to anchor the parts of the frame so as to prevent the frame from being accidentally moved from its adjusted position, as for example, when the wind is blowing or during other inclement weather.

Each of the leg assemblies 22 includes a triangular shaped hollow standard 30, Figure 6, and slidably mounted in each of the standards 30 is a post 31 which has a lower pointed end 32. The standards 30 are provided with a plurality of apertures 33 which register with similar apertures in the post 31, and suitable securing elements such as the bolts 34 are adapted to be extended through these registering apertures so as to maintain the post 31 and standards 30 immobile in their various adjusted positions. Thus, by removing the bolts or pins 34, the post 31 can be moved into or out of the standards 30 so that the effective height of the tent frame can be adjusted as desired, as for example when short or tall people are using the tent.

It is to be understood that the present invention illustrates the tent frame only and that any desired type of canopy or tent can be supported on the tent frame of the present invention.

The inner end of each of the beams 13 is provided with a tapered surface 35, and teeth 36 are provided on the tapered surface 35 whereby the teeth 36 can engage portions of the support members 11 so as to help retain the beams 13 immobile as for example when the beams are in the position shown in Figure 10. The inner end of each beam 13 is further provided with an aperture 37 as well as a cutout 39, and the cutout 39 defines a finger 40, Figures 9 and 10. A pin 38 is adapted to be inserted through the aperture 37 as shown in Figure 9, or else the pin 38 can be extended through the cutout 39 so that the beam can be maintained immobile in its different adjusted positions. With the beams 13 in the position shown in Figure 10, the rear of the frame will be in a raised or elevated position so that greater clearance is provided, as for example when the tent is being used by tall people.

A rubber or resilient bushing 41 is mounted on the rear end of each of the beams 13 so that when the beams 13 are in their retracted position as for example as shown in Figure 8, the bushings 41 will provide an effective seal for the channel ways 12 whereby water or the like will be prevented from entering these channels ways.

From the foregoing it is apparent that there has been provided a tent frame which is especially suitable for use with vehicles such as the vehicle 10 which may be a station wagon or the like. In use, the vehicle 10 is provided with the pair of support members 11 and each support member 11 has a channel way 12 in which is slidably mounted a beam 13 that is L-shaped in cross section, Figure 5. When the device is not being used, the rear supporting structure is detached from the beams 13 and then the beams 13 are slid inwardly into the channel ways 12 so that the resilient bushings 41 will close off the rear end of the channel ways 12 so as to prevent water or other foreign matter from entering these channel ways. However, when the tent frame is being used as for example, when it is being used to support a canopy or a piece of canvas, as for example when the tent is to be used by hunters, campers or the like, then the parts are arranged as shown in Figures 1 and 2. Thus, the rear ends of the beams 13 are detachably connected to the leg assemblies 22 by means of the bolts or pins 21 after the beams 13 have been moved to their extended or outer positions. The height of the legs 22 can be adjusted by removing the pins 34 until the posts 31 are at the desired position and then the pins 34 are inserted through the registering apertures 33 and the apertures in the post 31 whereby the leg assemblies will be maintained immobile at their desired adjusted position. If desired the pair of arms 15 and 17 can be used in their horizontal position so that the canvas or canopy can be supported or hung over the beams 13. However, in the event that greater head space is desired, then the pair of arms 15 and 17 can be swung upwardly about the hinges 16 and 18, Figure 7 and the slot 23 can engage the cutouts 24 so as to maintain the arms 15 and 17 in their adjusted position, as for example, as shown in Figure 4. With the arms 15 and 17 in the raised position as shown in Figure 4, the cable 29 can be wrapped or trained around the recess portion 25 of the arm 17 and the ends of the cable 29 are connected to the eyelets 28 and 27 so that the parts will be anchored in their adjusted position. A further adjustment is provided due to the provision of the construction shown in Figures 9 and 10 and it will be seen that the beams 13 can also be used in their lowered position as shown in Figure 9. Thus, when the parts are in the position shown in Figure 9 the pin 38 extends through the vehicle and through the apertures 37 in the inner end of the beams 13 so that the beams 13 are maintained steady in their adjusted position. However, when it is desired to raise the rear end of the tent frame, the pin 38 can be removed so that the beams 13 can be removed from the position shown in Figure 9 to the position shown in Figure 10 and then the pins 38 can be extended through the vehicle until they engage the cutouts 39 in the beams 13 so that the beams 13 will be maintained in elevated or raised position. The teeth 36 engage the lower portion of the support members 11 in order to provide a better gripping action between the beams and support members. The outer ends of the pins 38 may be provided with handle portions so as to facilitate the manual removal or replacement of the pins.

When the device is to be stored or transported from place to place, the pins or bolts 21 can be removed whereby the legs 22 are detached from the bar 14 and from the beams 13 and then the bar 14 is detached and moved to a folded position. Thus, the device can be readily disassembled so that the various parts can be readily stored or held in the trunk of a vehicle or other locality. When the device is not being used the beams 13 slide into the channel ways 12 as previously described.

The frame can be manufactured for a low cost and the device is ruggedly constructed so that it will withstand rough usage. While the bushings 41 have been previously described as being made of a resilient material, it is to be understood that the bushings 41 as well as the other parts can be made of any suitable material and in different shapes or sizes. Due to the provision of the adjustable features previously described, the frame can be adjusted to different positions as desired by the user. For example, during rainy weather, the parts can be moved to the position shown in Figure 4 so that when the canopy is placed over the frame, rain will have a tendency to run off the canopy rather than remain on the center portion thereof. It is to be understood that the frame is large enough so that when the tent is in its extended position that a plurality of persons may comfortably sit therein. It is to be understood that the assembly of the present invention can be adapted to vehicles of different types or styles.

I claim:

1. In combination, a vehicle, a pair of horizontally disposed support members arranged in said vehicle and said support members being provided with channel ways therein, a beam slidably mounted in each of said channel ways and said beams being L-shaped in cross section, a horizontally disposed bar extending transversely across the rear ends of said beams, vertically disposed ears depending from the ends of said bar and secured to said beams, a first and second arm hingedly connected to the ends of said bar, there being a slot in the free end of said first arm, there being opposed cutouts in said second arm for engagement with the slot in the first arm, said second arm being provided with a recessed end portion defining a shoulder, an eyelet extending rearwardly from the vehicle, a pair of spaced parallel vertically disposed legs each including an upper triangular shaped hollow standard secured to a corresponding beam, a post slidably mounted in each standard and provided with a lower pointed end, there being registering apertures in said standards and posts, securing elements extending through said registering apertures, an eyelet extending from one of said standards, a cable trained over the recessed portion of said second arm and having pins connected to said eyelet.

2. In a vehicle tent frame, a pair of spaced parallel horizontally disposed beams each being L-shaped in cross section, a horizontally disposed bar extending transversely across the rear ends of said beams, vertically disposed ears depending from the ends of said bar and secured to said beams, first and second arms hingedly connected to the ends of said bar, there being a slot in the free end of one of said arms, there being a folded cutout in the other arm for engagement with said slot, said second named arm being provided with a recessed end portion defining a shoulder, a pair of spaced parallel vertically disposed legs including an upper triangular shaped hollow standard secured to a corresponding beam, a post slidably mounted in the standard and provided with a lower pointed end, there being registering apertures in said standards and posts, securing elements extending through said registering apertures, an eyelet extending outwardly from one of said standards, and a cable trained over the recessed portion of said arm and having its end connected to said eyelet, and the other end of said cable adapted to be connected to a supporting structure.

3. In a vehicle tent frame, a pair of spaced parallel horizontally disposed beams each being L-shaped in cross section, a horizontally disposed bar extending transversely across the rear ends of said beams, vertically disposed ears depending from the ends of said bar and secured to said beams, first and second arms hingedly connected to the ends of said bar, there being a slot in the free end of one of said arms, there being a folded cutout in the other arm for engagement with said slot, said second named arm being provided with a recessed end portion defining a shoulder, a pair of spaced parallel vertically disposed legs including an upper triangular shaped hollow standard secured to a corresponding beam, a post slidably mounted in the standard and provided with a lower pointed end, there being registering apertures in said standards and posts, securing elements extending through said registering apertures, an eyelet extending outwardly from one of said standards, and a cable trained over the recessed portion of said arm and having its end connected to said eyelet, and the other end of said cable adapted to be connected to a supporting structure, said beams including an inner tapered portion provided with a cutout, there being an aperture in the inner portion of each of said beams, and a pin selectively engaging said last named aperture and cutout.

4. The structure as defined in claim 3 and further including resilient bushings on the outer ends of said beams, and teeth on the tapered portions of said beams.

References Cited in the file of this patent

UNITED STATES PATENTS

| 1,185,981 | Campbell | June 6, 1916 |
| 2,533,683 | Neuhaus | Dec. 12, 1950 |
| 2,706,132 | Chaffin | Apr. 12, 1955 |

FOREIGN PATENTS

| 798,110 | France | Mar. 2, 1936 |